US012646181B2

(12) United States Patent (10) Patent No.: US 12,646,181 B2
Song (45) Date of Patent: Jun. 2, 2026

(54) OBJECT TRACKING METHOD AND ELECTRONIC APPARATUS THEREFOR

(71) Applicant: Samsung Electronics Co., Ltd., Suwon-si (KR)

(72) Inventor: Wonseok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/474,629

(22) Filed: Sep. 26, 2023

(65) Prior Publication Data

US 2024/0013405 A1 Jan. 11, 2024

Related U.S. Application Data

(63) Continuation of application No. PCT/KR2022/007110, filed on May 18, 2022.

(30) Foreign Application Priority Data

May 18, 2021 (KR) ........................ 10-2021-0064110

(51) Int. Cl.
 *G06T 7/20* (2017.01)
 *G06T 3/40* (2024.01)
 (Continued)

(52) U.S. Cl.
 CPC .................. *G06T 7/20* (2013.01); *G06T 3/40* (2013.01); *G06V 10/25* (2022.01); *H04N 23/61* (2023.01); *H04N 23/69* (2023.01); *G06V 2201/07* (2022.01)

(58) Field of Classification Search
 None
 See application file for complete search history.

(56) References Cited

U.S. PATENT DOCUMENTS

| 5,756,981 A | * | 5/1998 | Roustaei | ........... G06K 7/10732 |
| | | | | 235/462.07 |
| 7,002,490 B2 | | 2/2006 | Lablans | |

(Continued)

FOREIGN PATENT DOCUMENTS

| CN | 111242988 A | 6/2020 | |
| EP | 4274219 A1 * | 11/2023 | ........... H04N 23/632 |

(Continued)

OTHER PUBLICATIONS

KR-20220128334-A, English translation (Year: 2022).*
International Search Report dated Aug. 31, 2022, issued in International Patent Application No. PCT/KR2022/007110.

*Primary Examiner* — Randolph I Chu
(74) *Attorney, Agent, or Firm* — Jefferson IP Law, LLP

(57) ABSTRACT

An electronic apparatus is provided. The electronic apparatus includes a display, a first camera having a first field of view (FOV), a second camera having a second FOV that is narrower than the first FOV, at least one processor, and a memory. The electronic apparatus is configured to obtain a series of first images by using the first camera, identify a first region of interest including an object from the series of first images, when the size of the first region of interest is within a specified first range, enlarge a first image region including the first region of interest, obtain a series of second images by using the second camera while tracking the object, by moving a lens of the second camera based on movement of the first region of interest within the first image region and a magnification of the first image region, and display the series of second images on the display.

18 Claims, 17 Drawing Sheets

(51) Int. Cl.
G06V 10/25 (2022.01)
H04N 23/61 (2023.01)
H04N 23/69 (2023.01)

(56) References Cited

U.S. PATENT DOCUMENTS

| | | | |
|---|---|---|---|
| 7,064,684 B2 | 6/2006 | Lablans | |
| 7,747,159 B2 | 6/2010 | Uenishi | |
| 8,203,628 B2 | 6/2012 | Honjo et al. | |
| 8,478,066 B2 * | 7/2013 | Fujita | H04N 25/61 |
| | | | 345/20 |
| 9,171,221 B2 | 10/2015 | Lablans | |
| 9,781,350 B2 | 10/2017 | Gao et al. | |
| 10,291,842 B2 | 5/2019 | Kim et al. | |
| 10,382,672 B2 | 8/2019 | Moon et al. | |
| 10,423,194 B2 * | 9/2019 | Lee | H04M 1/72403 |
| 10,573,011 B2 | 2/2020 | Kim et al. | |
| 10,578,948 B2 | 3/2020 | Shabtay et al. | |
| 10,871,798 B2 | 12/2020 | Lee | |
| 10,935,870 B2 | 3/2021 | Shabtay et al. | |
| 11,048,061 B2 | 6/2021 | Park et al. | |
| 11,310,405 B2 | 4/2022 | Shabtay et al. | |
| 11,336,830 B2 | 5/2022 | Shabtay et al. | |
| 11,599,007 B2 | 3/2023 | Shabtay et al. | |
| 11,611,706 B2 | 3/2023 | Shabtay et al. | |
| 12,407,933 B2 * | 9/2025 | Wang | H04N 23/61 |
| 2005/0264679 A1 | 12/2005 | Sasaki et al. | |
| 2013/0229529 A1 | 9/2013 | Lablans | |
| 2014/0341427 A1 * | 11/2014 | Kawano | H04N 23/61 |
| | | | 382/103 |
| 2014/0355130 A1 * | 12/2014 | Takemoto | G02B 15/173 |
| | | | 359/684 |
| 2016/0381289 A1 * | 12/2016 | Kim | H04N 23/69 |
| | | | 348/38 |
| 2017/0094184 A1 * | 3/2017 | Gao | G06T 7/337 |
| 2018/0196472 A1 * | 7/2018 | Lee | H04N 5/772 |
| 2018/0201260 A1 * | 7/2018 | Ichikawa | G01S 17/58 |
| 2019/0004282 A1 | 1/2019 | Park et al. | |
| 2020/0019213 A1 | 1/2020 | Lee | |
| 2021/0084231 A1 * | 3/2021 | Lee | G06F 3/0416 |
| 2021/0405518 A1 | 12/2021 | Lablans | |
| 2022/0385797 A1 | 12/2022 | Shabtay et al. | |
| 2023/0029566 A1 * | 2/2023 | Kim | G06T 7/292 |
| 2023/0125560 A1 | 4/2023 | Lablans | |
| 2023/0199314 A1 | 6/2023 | Shabtay et al. | |
| 2024/0013405 A1 * | 1/2024 | Song | H04N 23/687 |

FOREIGN PATENT DOCUMENTS

| | | | | |
|---|---|---|---|---|
| JP | 2005-338352 A | 12/2005 | | |
| JP | 2008-197286 A | 8/2008 | | |
| JP | 2013-050730 A | 3/2013 | | |
| KR | 10-2006-0104380 A | 9/2006 | | |
| KR | 10-2010-0050264 A | 5/2010 | | |
| KR | 10-2016-0149945 A | 12/2016 | | |
| KR | 10-2017-0000311 A | 1/2017 | | |
| KR | 10-2017-0008608 A | 1/2017 | | |
| KR | 10-2017-0057058 A | 5/2017 | | |
| KR | 10-2018-0056182 A | 5/2018 | | |
| KR | 10-2018-0081918 A | 7/2018 | | |
| KR | 10-2018-0092621 A | 8/2018 | | |
| KR | 101897923 B1 * | 10/2018 | | G06N 3/08 |
| KR | 10-2018-0132982 A | 12/2018 | | |
| KR | 10-2019-0001695 A | 1/2019 | | |
| KR | 10-2019-0075654 A | 7/2019 | | |
| KR | 10-2020-0110662 A | 9/2020 | | |
| KR | 20220128334 A * | 9/2022 | | H04N 23/951 |
| WO | 18159864 A1 | 9/2018 | | |

* cited by examiner

200

OBJECT TRACKING METHOD AND ELECTRONIC APPARATUS THEREFOR

CROSS-REFERENCE TO RELATED APPLICATION(S)

This application is a continuation application, claiming priority under § 365(c), of an International application No. PCT/KR2022/007110, filed on May 18, 2022, which is based on and claims the benefit of a Korean patent application number filed on May 18, 2021, in the Korean Intellectual Property Office, the disclosure of which is incorporated by reference herein in its entirety.

BACKGROUND

1. Field

The disclosure relates to an object tracking method and an electronic device therefor.

2. Description of Related Art

For example, a user of a mobile electronic device may want to capture an image of a target image while tracking the object. In general, a camera module of the mobile electronic device may have a fixed field of view (FOV) with respect to the mobile electronic device. Accordingly, the user may have to move the mobile electronic device with the movement of the object for object tracking. In this case, image deterioration may occur due to the user's movement. In addition, when the user does not handheld the mobile electronic device, object tracking may not be possible.

The mobile electronic device may provide an object tracking function through image cropping. For example, the mobile electronic device may identify an object from an image and crop a region including the object from the image so that the object is positioned at the central portion of a cropped image. Therefore, even if the user does not move the mobile electronic device, an image in which the object is tracked may be acquired.

The above information is presented as background information only to assist with an understanding of the disclosure. No determination has been made, and no assertion is made, as to whether any of the above might be applicable as prior art with regard to the disclosure.

SUMMARY

When object tracking based on image cropping is performed, it may be difficult to track an object with a large amount of movement because the FOV is fixed. In addition, when the object moves away from the camera module, image deterioration due to image cropping may occur. Furthermore, as the image size of the object decreases, an object recognition rate may decrease. When a high-magnification camera (e.g., a telephoto lens camera) is used to increase the recognition rate of the object, it may be difficult to track the object due to a relatively narrow FOV.

Aspects of the disclosure are to address at least the above-mentioned problems and/or disadvantages and to provide at least the advantages described below. Accordingly, an aspect of the disclosure is to provide an object tracking method and an electronic device therefor.

Additional aspects will be set forth in part in the description which follows and, in part, will be apparent from the description, or may be learned by practice of the presented embodiments.

In accordance with an aspect of the disclosure, an electronic device is provided. The electronic device includes a display, a first camera having a first field of view (FOV), a second camera having a second FOV that is narrower than the first FOV, at least one processor, and a memory, in which the memory stores instructions that, when executed by the at least one processor, cause the electronic device to acquire a series of first images using the first camera, identify a first region of interest including an object from the series of first images, enlarge a first image region including the first region of interest if a size of the first region of interest is within a specified first range, acquire a series of second images using the second camera while tracking the object, by moving a lens of the second camera based on a movement of the first region of interest within the first image region and an enlargement magnification of the first image region, and display the series of second images on the display.

In accordance with another aspect of the disclosure, a method for object tracking of an electronic device is provided. The method includes acquiring a series of first images using a first camera having a first field of view (FOV), identifying a first region of interest including an object from the series of first images, enlarging a first image region including the first region of interest if a size of the first region of interest is within a specified first range, and tracking the object, by moving a lens of a second camera having a second FOV narrower than the first FOV based on a movement of the first region of interest within the first image region and an enlargement magnification of the first image region.

An electronic device according to an embodiment disclosed herein can improve object tracking performance by identifying an object using a camera having a relatively wide FOV and moving a camera lens having a relatively narrow FOV according to movement of the identified object.

The electronic device according to an embodiment disclosed herein may provide improved object tracking by tracking an object using an enlarged image.

The electronic device according to an embodiment disclosed herein can improve image quality by acquiring an object image using a camera having a relatively high magnification.

The electronic device according to an embodiment disclosed herein may provide adaptive object tracking by switching cameras according to an image size of an object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
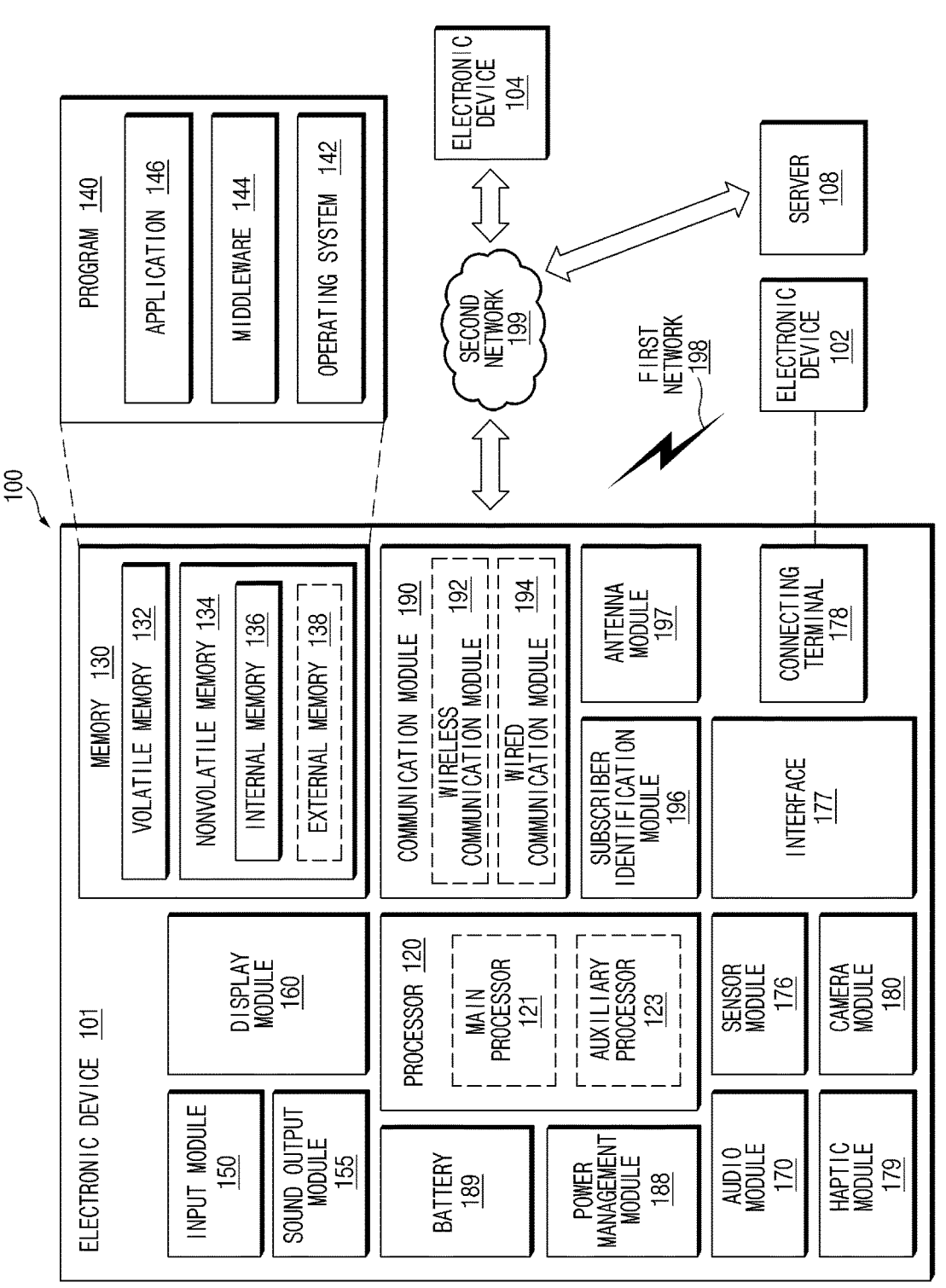
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
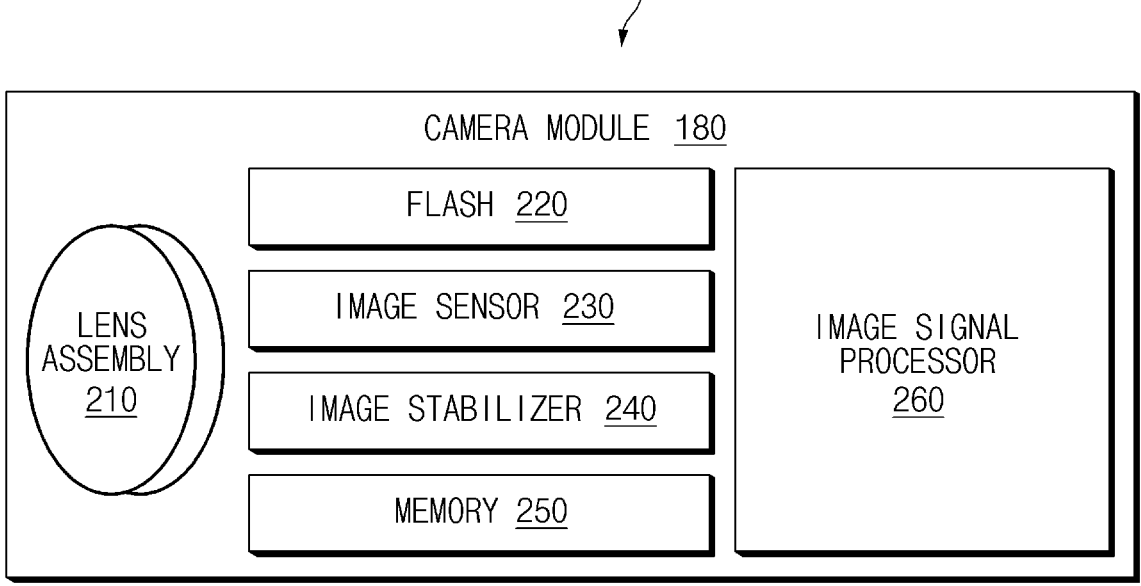
FIG. 2 is a block diagram illustrating a camera module according to an embodiment of the disclosure.

FIG. 2 is a block diagram 200 illustrating a camera module according to an embodiment of the disclosure.

Referring to FIG. 2, the camera module 180 may include a lens assembly 210, a flash 220, an image sensor 230, an image stabilizer 240, a memory 250 (e.g., buffer memory), or an image signal processor 260. The lens assembly 210 may collect light emitted or reflected from an object whose image is to be taken. The lens assembly 210 may include one or more lenses. According to an embodiment of the disclosure, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment of the disclosure, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment of the disclosure, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment of the disclosure, the image stabilizer 240 may detect such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment of the disclosure, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the external electronic device 102, the external electronic device 104, or the server 108) outside the camera module 180. According to an embodiment of the disclosure, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment of the disclosure, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
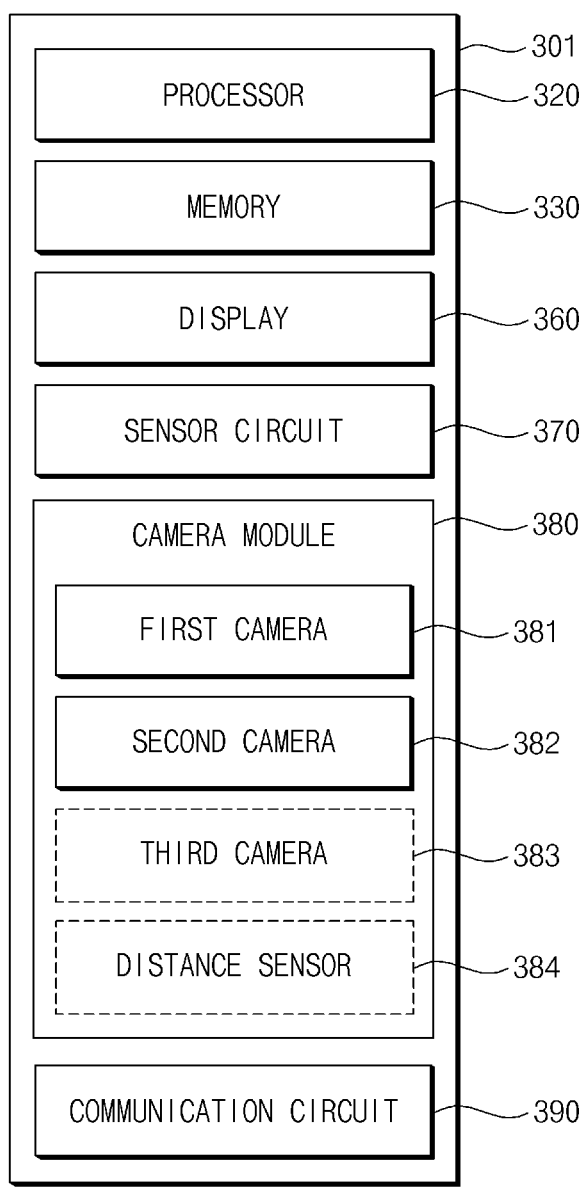
FIG. 3 illustrates a block diagram of an electronic device according to an embodiment of the disclosure.

FIG. 3 illustrates a block diagram of electronic devices according to an embodiment of the disclosure.

Referring to FIG. 3, according to an embodiment of the disclosure, an electronic device 301 (e.g., the electronic device 101 of FIG. 1) may include a processor 320 (e.g., the processor 120 of FIG. 1), a memory 330 (e.g., the memory 130 of FIG. 1), a display 360 (e.g., the display module 160 of FIG. 1), a sensor circuit 370 (e.g., the sensor module 176 of FIG. 1), a camera module 380 (e.g., the camera module 180 of FIG. 1), and/or a communication circuit 390 (e.g., the communication module 190 of FIG. 1). The processor 320 may be operatively connected to the memory 330, a sensor circuit 350, the display 360, the sensor circuit 370, the camera module 380, and the communication circuit 390. The memory 330 may store one or more instructions that, when executed, cause the processor 320 to perform various operations of the electronic device 301.

The display 360 may include a plurality of pixels. For example, the electronic device 301 may display an image acquired using the camera module 380 on the display 360. The display 360 may include a touch screen capable of detecting a touch input. The electronic device 301 may identify an object in the displayed image based on input to the display 360. For example, the user may perform the touch input on the displayed object, thereby capturing moving images while tracking the corresponding object.

The sensor circuit 370 may include at least one sensor (e.g., an acceleration sensor, an inertial sensor, and/or a gyro sensor) capable of detecting motion information about the electronic device 301. The electronic device 301 may detect the motion information about the electronic device 301 using the sensor circuit 370 and control the camera module 380 based on the motion information and the movement of the object. For example, the electronic device 301 may move (e.g., a moving direction and a moving position) a lens of a second camera 382 based on the motion information about the electronic device 301.

The camera module 380 may include a plurality of cameras. For example, the camera module 380 may include a first camera 381 and a second camera 382. The camera module 380 may further include components, such as a third camera 383 and a distance sensor 384. The first camera 381 may have a first field of view (FOV). The first camera 381 may include, for example, a wide-angle lens. The second camera 382 may have a second FOV. The second FOV may be narrower than the first FOV. The second camera 382 may include, for example, a telephoto lens. The third camera 383 may have a third FOV. The third FOV may be wider than the first FOV. The third camera 383 may include, for example, an ultra wide-angle lens. The first camera 381, the second camera 382, and the third camera 383 may be disposed in the electronic device 301 to face the same direction with respect to the electronic device 301. For example, the first camera 381, the second camera 382, and the third camera 383 may be disposed on a back surface of the electronic device 301. At least one of the first camera 381, the second camera 382, and the third camera 393 may include a component for image stabilization (e.g., optical image stabilization (OIS)). The second camera 382 may be configured to move the center direction of the second FOV. Hereinafter, the movement of the lens of the second camera 382 may be referred to as an operation of moving the central axis of the second FOV of the second camera 382. The movement of the lens of the second camera 382 may be described below with reference to FIGS. 4 to 8.

The distance sensor 384 may include at least one sensor for measuring a distance between the camera module 380 and an object. For example, the distance sensor 384 may include a time of flight (ToF) sensor, a laser sensor, an infrared sensor, and/or a lidar sensor. The electronic device 301 may be configured to perform auto focusing (AF) using the distance sensor 384.

The communication circuit 390 may be configured to support short-range wireless communication and/or long-range wireless communication. For example, the communication circuit 390 may support short-range wireless communication, such as support Bluetooth (e.g., Bluetooth legacy and/or Bluetooth low energy (BLE)), neighbor awareness network (NAN), Wi-Fi Direct, and/or ultrawide band (UWB) communication).

The electronic device 301 may further include a component not illustrated in FIG. 3 (e.g., at least one of the components of the electronic device 101 of FIG. 1). For example, the electronic device 301 may further include a battery and a housing. Hereinafter, operations of the electronic device 301 may be described with reference to the components of the electronic device 301 described above with reference to FIG. 3. For example, the operations of the electronic device 301 may be referred to as being performed by the processor 320.

Figure 4:
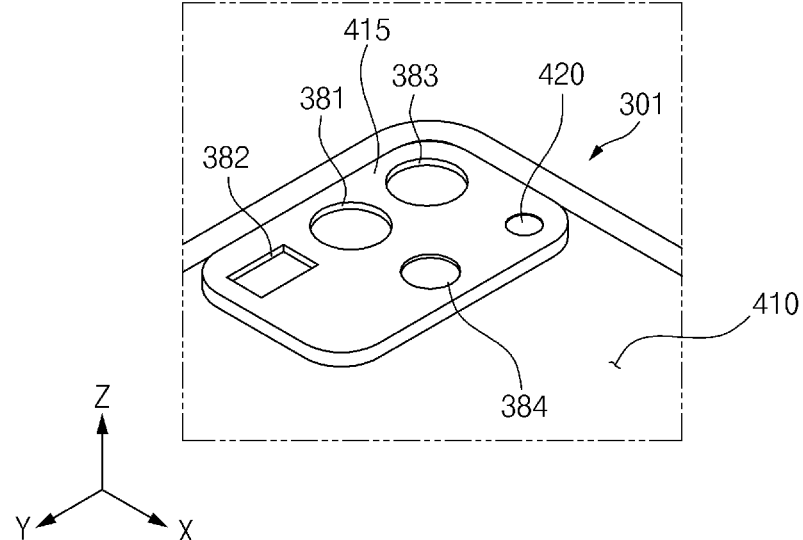
FIG. 4 illustrates a camera module according to an embodiment of the disclosure.

FIG. 4 illustrates a camera module according to an embodiment of the disclosure.

Referring to FIGS. 3 and 4, at least a portion of the camera module 380 may be viewable through one surface 410 of the housing of the electronic device 301. For example, the surface 410 may correspond to a back surface of the housing of the electronic device 301. The camera module 380 may be configured to acquire an external image through a transparent hole of a camera island 415 positioned on the surface 410 of the housing. For example, the camera island 415 may include a plurality of transparent holes formed of a transparent member. The camera island 415 may be referred to as a decoration member.

In the example of FIG. 4, the first camera 381, the second camera 382, the third camera 383, and the distance sensor 384 may be disposed within the housing to acquire images or distance information toward a +z direction. In the example of FIG. 4, the camera island 415 may include a hole for a flash 420. For example, the camera island 415 may further include a hole (e.g., a microphone hole) not illustrated. At least some of the illustrated components may be omitted. Although the camera island 415 is formed to protrude from the surface 410 of the housing, the camera island 415 may form substantially the same plane as the surface 410.

Figure 5:
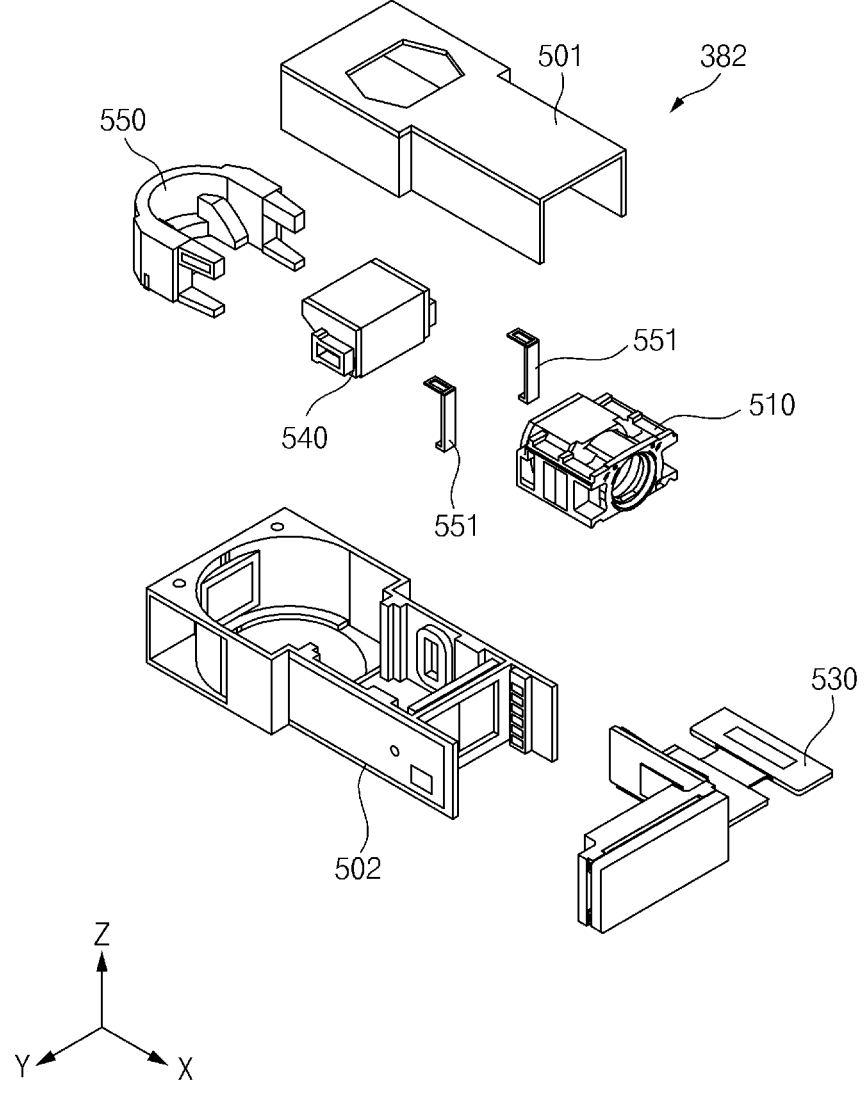
FIG. 5 illustrates a structure of a second camera according to an embodiment of the disclosure.

FIG. 5 illustrates a structure of a second camera according to an embodiment of the disclosure.

Referring to FIG. 5, the second camera 382 may include an upper housing 501 and a lower housing 502. A refractive member 540 (e.g., a prism) may be positioned within the lower housing 502 and receive light through an opening formed in the upper housing 501. The refractive member 540 may be configured to refract light in a −z direction to a +x direction (e.g., from the refractive member 540 toward a lens assembly 510). The refractive member 540 may be fixed to a guide 550 by a fixing member 551. For example, the refractive member 540 may be referred to as a lens of the second camera 382 together with the lens assembly 510 (e.g., the lens assembly 210 of FIG. 2).

The guide 550 may be positioned within the lower housing 502. The guide 550 may be configured to move the refractive member 540 together with lower housing 502. For example, the guide 550 may include at least one magnetic member (e.g., a magnet and/or an electromagnet). The electronic device 301 may move the guide 550 by adjusting the magnetism of the magnetic member positioned in the lower housing 502. For example, the guide 550 may include at least one gear (not illustrated). The electronic device 301 may move the guide 550 by controlling a driving unit interlocked with a gear of the guide 550. In one example, the driving unit may be positioned in the lower housing 502. For example, the electronic device 301 may perform image stabilization by moving the guide 550.

The lens assembly 510 may include a plurality of lenses. For example, the electronic device 301 may perform focusing by moving a plurality of lenses in the lens assembly 510. The electronic device 301 may perform focusing by adjusting intervals between the plurality of lenses. The lens assembly 510 may deliver light refracted by the refractive member 540 to an image sensor assembly 530 (e.g., the image sensor 230 of FIG. 2). The image sensor assembly 530 may convert an optical signal received through the lens assembly 510 into an electrical signal and transmit the converted electrical signal to a processor (e.g., the image signal processor 260 of FIG. 2).

Figure 6:
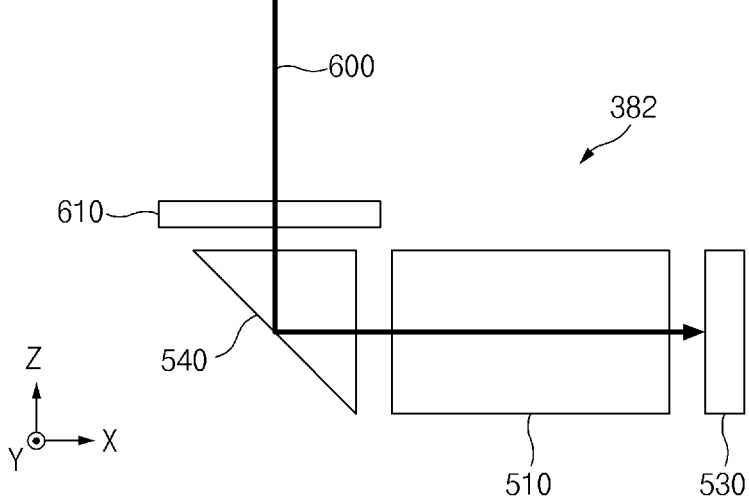
FIG. 6 illustrates a schematic diagram of a second camera according to an embodiment of the disclosure.

FIG. 6 illustrates a schematic diagram of a second camera according to an embodiment of the disclosure.

Referring to FIGS. 5 and 6, the second camera 382 may receive light through the refractive member 540. For example, the refractive member 540 may be positioned below a cover window 610. The cover window 610 may correspond to the transparent hole formed in the camera island 415 of FIG. 4. Light incident in the −z direction through the cover window 610 may be refracted in the +x direction by the refractive member 540. The light refracted in the +x direction may be incident to the image sensor assembly 530 through the lens assembly 510. The light passing through the lens assembly 510 may be focused on an image sensor of the image sensor assembly 530.

As described above with reference to FIG. 3, the electronic device 301 may move the lens of the second camera 382. The electronic device 301 may change an optical axis 600 by moving the refractive member 540 and/or the lens assembly 510 of the second camera 382. For example, the optical axis 600 may be referred to as an axis perpendicular to a surface of the refractive member 540 adjacent to the cover window 610. Hereinafter, the movement of the lens of the second camera 382 according to an embodiment will be described with reference to FIGS. 7 and 8.

Figure 7:
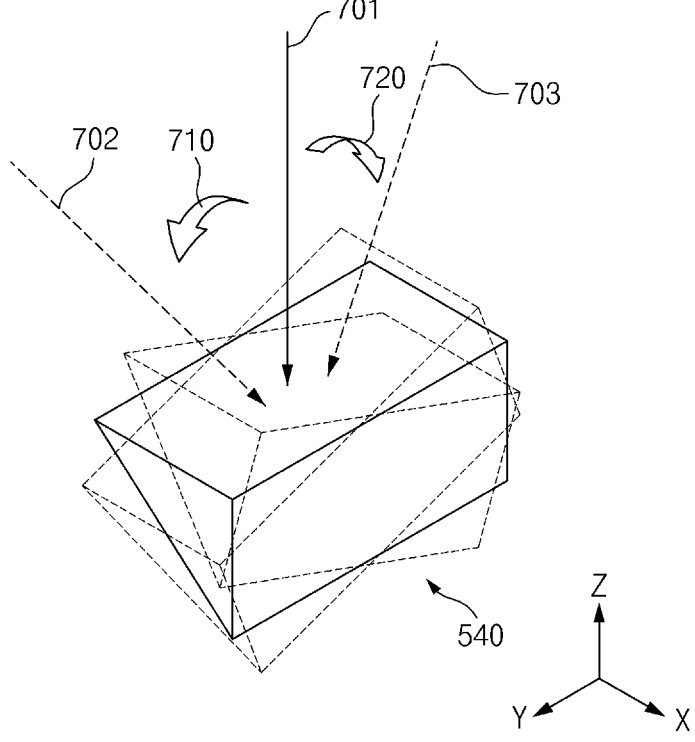
FIG. 7 illustrates panning of a lens of a second camera according to an embodiment of the disclosure.

FIG. 7 illustrates panning of a lens of a second camera according to an embodiment of the disclosure.

Referring to FIGS. 5 and 7, according to an embodiment of the disclosure, the electronic device 301 may pan the lens of the second camera 382. For example, the electronic device 301 may pan the lens by rotating the refractive member 540 around an x-axis. When panning is not performed, an optical axis of the refractive member 540 may correspond to a first direction 701 (e.g., the −z direction).

For example, the electronic device 301 may perform a first rotation 710 with respect to the refractive member 540. The first rotation 710 may mean rotating the refractive member 540 in a +y-axis direction around the x-axis. With the first rotation 710, the optical axis of the refractive member 540 may change from the first direction 701 to a second direction 702. Accordingly, the central axis of the second FOV of the second camera 382 may change from the first direction 701 to the second direction 702.

For example, the electronic device 301 may perform a second rotation 720 with respect to the refractive member 540. The second rotation 720 may mean rotating the refractive member 540 in a −y-axis direction around the x-axis. With the second rotation 720, the optical axis of the refractive member 540 may change from the first direction 701 to a third direction 703. Accordingly, the central axis of the second FOV of the second camera 382 may change from the first direction 701 to the third direction 703.

Figure 8:
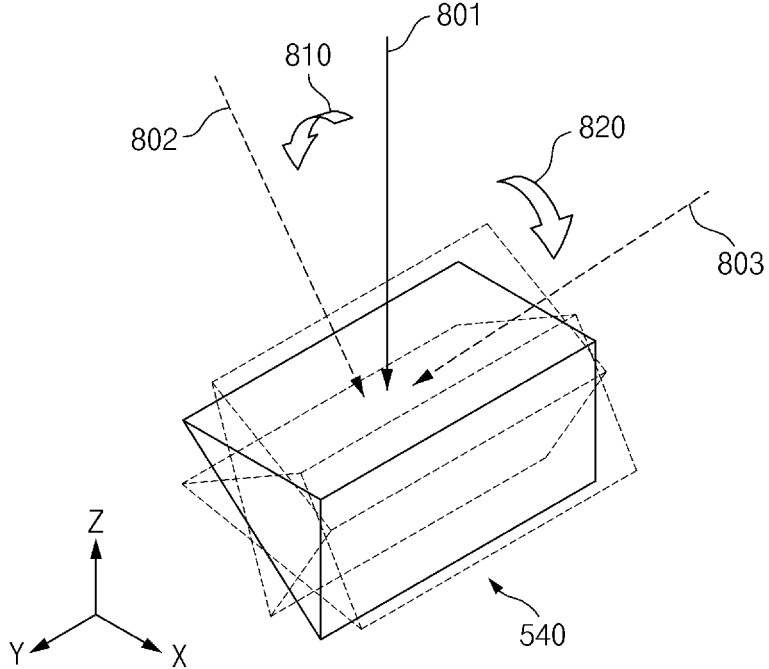
FIG. 8 illustrates tilting of a lens of a second camera according to an embodiment of the disclosure.

FIG. 8 illustrates tilting of a lens of a second camera according to an embodiment of the disclosure.

Referring to FIGS. 5 and 8, according to an embodiment of the disclosure, the electronic device 301 may tilt the lens of the second camera 382. For example, the electronic device 301 may tilt the lens by rotating the refractive member 540 around a y-axis. When tilting is not performed, an optical axis of the refractive member 540 may correspond to a first direction 801 (e.g., the −z direction).

For example, the electronic device 301 may perform a first rotation 810 with respect to the refractive member 540. The first rotation 810 may mean rotating the refractive member 540 in a −x-axis direction around the y-axis. With the first rotation 810, the optical axis of the refractive member 540 may change from the first direction 801 to a second direction 802. Accordingly, the central axis of the second FOV of the second camera 382 may change from the first direction 801 to the second direction 802.

For example, the electronic device 301 may perform a second rotation 820 with respect to the refractive member 540. The second rotation 820 may mean rotating the refractive member 540 in a +x-axis direction around the y-axis. With the second rotation 820, the optical axis of the refractive member 540 may change from the first direction 801 to a third direction 803. Accordingly, the central axis of the second FOV of the second camera 382 may change from the first direction 801 to the third direction 803.

The electronic device 301 disclosed herein may tilt and/or pan the lens of the second camera 382. The electronic device 301 may change the central axis of the FOV of the second camera 382 in an arbitrary direction by tilting and/or panning the lens. According to an embodiment of the disclosure, the electronic device 301 may perform object tracking by moving the lens of the second camera 382. Hereinafter, object tracking methods for the electronic device 301 may be described with reference to FIGS. 9 to 17.

Figure 9:
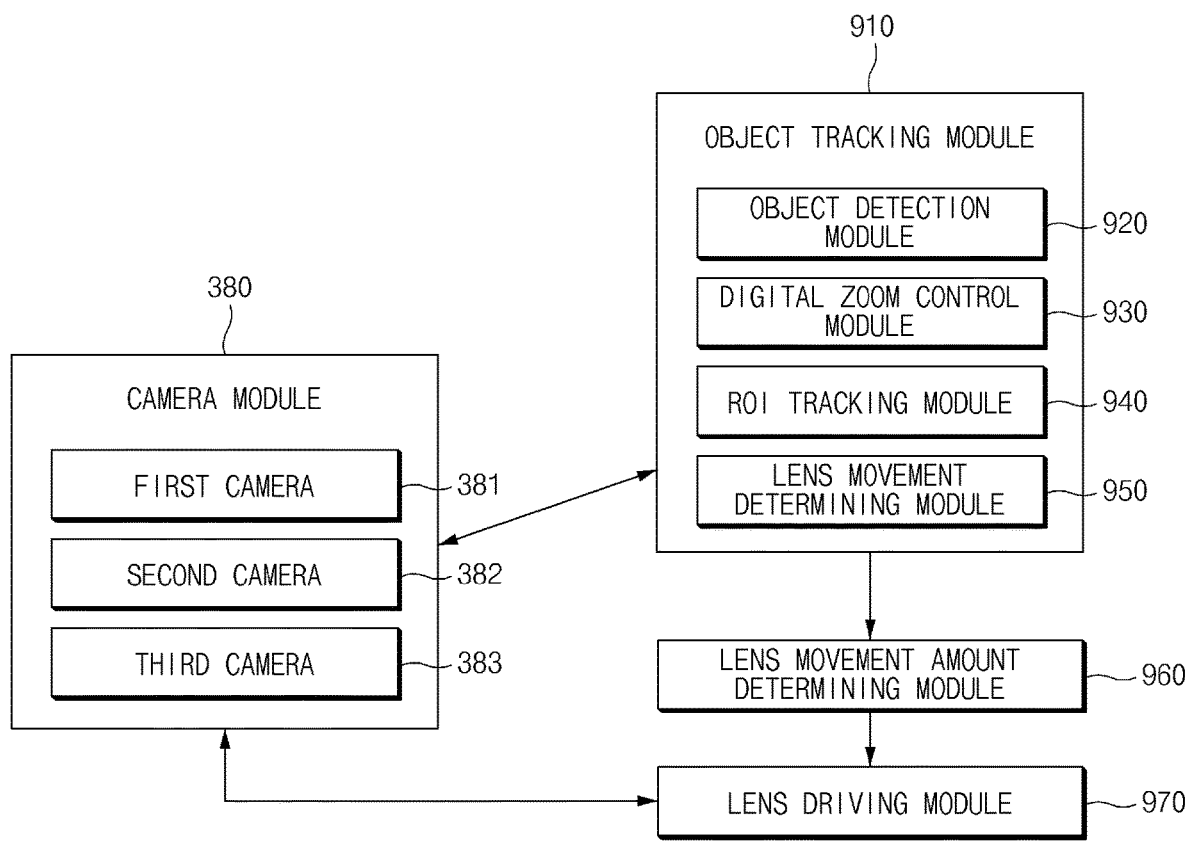
FIG. 9 illustrates a block diagram of an object tracking system according to an embodiment of the disclosure.

FIG. 9 illustrates a block diagram of an object tracking system according to an embodiment of the disclosure.

Referring to FIG. 9, according to an embodiment of the disclosure, the electronic device 301 may include an object tracking system. For example, the object tracking system may include a camera module 380, an object tracking module 910, a lens movement amount determining module 960, and a lens driving module 970. For example, the object tracking module 910, the lens movement amount determining module 960, and the lens driving module 970 may be software modules. For example, the object tracking module 910, the lens movement amount determining module 960, and the lens driving module 970 may be implemented by a processor (e.g., the processor 320 of FIG. 3).

The object tracking module 910 may be configured to perform object tracking. The object tracking module 910 may include an object detection module 920, a digital zoom control module 930, a region of interest (ROI) tracking module 940, and a lens movement determining module 950.

The object detection module 920 may be configured to perform object detection on an image acquired through the camera module 380. For example, the object detection module 920 may perform object detection on images acquired from the first camera 381, the second camera 382, and/or the third camera 383. For example, the object detection module 920 may detect an object from an image based on edge detection, color pattern analysis, and/or distance information. The object detection module 920 may set an ROI for a detected object. The ROI may refer to an image region (e.g., a rectangular or arbitrary-shaped region) containing an object to be tracked. The object to be tracked may be set based on a user input or may be a specified object (e.g., a shape corresponding to a person).

According to an embodiment of the disclosure, the object detection module 920 may determine a camera to be used for object detection based on the size of the object. For example, when the size of the object (e.g., the size of the ROI) falls within or is greater than a first range, the object detection module 920 may detect the object using the first camera 381. When the size of the object is smaller than the first range, the object detection module 920 may detect the object using the second camera 382. According to an embodiment of the disclosure, the object detection module 920 may attempt object detection using a plurality of cameras. For example, the object detection module 920 may acquire a first image from the first camera 381 and acquire a second image from the second camera 382. The object detection module 920 may attempt object detection for each of the first image and the second image. When the size of the object is smaller than the first range, the object detection module 920 may fail to detect the object from the first image. In this case, the object detection module 920 may perform object detection using the second camera 382. When the size of the object falls within the first range, the object detection module 920 may detect the object from the first image and the second image. In this case, the object detection module 920 may perform object detection using the first camera 381 having a relatively wide FOV.

According to an embodiment of the disclosure, the object detection module 920 may determine a camera to be used for object detection based on the movement amount of the object. For example, if the movement amount of the object is less than a specified movement amount, the object detection module 920 may perform object detection using the first camera 381 or the second camera 382. If the movement amount of the object is greater than or equal to the specified movement amount, the object detection module 920 may perform object detection using the third camera 383. Object tracking may be improved by using the third camera 383 having a relatively wide angle of view.

According to an embodiment of the disclosure, the object detection module 920 may determine a camera to be used for object detection based on whether an object is detected and the movement amount of the object. For example, if the object detection module 920 is able to detect the object from all of the images acquired using the first camera 381, the second camera 382, and the third camera 383, the object detection module 920 may select a camera to be used for object detection based on the movement amount of the object. In this case, if the movement amount of the object is less than the specified movement amount, the object detection module 920 may perform object detection using the first camera 381 or the second camera 382. If the movement amount of the object is greater than or equal to the specified movement amount, the object detection module 920 may perform object detection using the third camera 383. Object tracking may be improved by using the third camera 383 having a relatively wide angle of view.

The digital zoom control module 930 may be configured to perform a magnification change, such as enlargement/reduction in the image acquired from the camera module 380. For example, the digital zoom control module 930 may be configured to enlarge a partial region of an image acquired from the camera module 380. The digital zoom control module 930 may be configured to improve image quality on the enlarged partial region of the image. For example, the digital zoom control module 930 may improve image quality through interpolation, upsampling, and/or machine learning-based image enhancement. Through the improving of image quality, a partial region of the enlarged image may include more pixels than the partial region before enlargement. For example, when the partial region of the image is enlarged to the size of the original image, the number of pixels of the original image and the number of pixels of an image of the enlarged partial region may have the same value.

The object detection module 920 may perform object detection on the enlarged image using the digital zoom control module 930. When the size of an object to be tracked (e.g., the ROI size) is small, object tracking may be difficult. When the ROI is not detected from the image, the object detection module 920 may enlarge a partial region of the image using the digital zoom control module 930. The object detection module 920 may detect the object using the enlarged image.

The ROI tracking module 940 may be configured to perform tracking on the detected ROI. For example, the ROI tracking module 940 may track the detected ROI from a plurality of image frames sequentially acquired from the camera module 380. The ROI tracking module 940 may detect movement of the ROI in a plurality of image frames. For example, the ROI tracking module 940 may track the movement of the ROI in the image frames by detecting the ROI from a first image frame and detecting the ROI from a second image frame subsequent to the first image frame.

The lens movement determining module 950 may determine whether the lens of the second camera 382 is moved. For example, when the ROI is out of the center (e.g., a specified region) in the image frames, the lens movement determining module 950 may determine the movement of the lens. The lens movement determining module 950 may identify the position of the ROI in the image frames, and may determine the movement of the lens if the identified position is out of the specified region.

The lens movement amount determining module 960 may determine the movement amount of the lens of the second camera 382. For example, the lens movement amount determining module 960 may determine the movement amount of the lens if movement of the lens is determined by the lens movement determining module 950 (e.g., if a signal indicating the lens movement is received).

According to an embodiment of the disclosure, the lens movement amount determining module 960 may determine the movement amount of the lens based on the movement amount of the ROI in the images. The lens movement amount determining module 960 may determine the movement amount of the lens so that the movement amount of the lens is proportional to the movement amount of the ROI.

For example, the lens movement amount determining module 960 may acquire the movement amount of the ROI from the ROI tracking module 940. The lens movement amount determining module 960 may determine the movement amount of the lens according to the movement amount of the ROI. In one example, the object detection module 920 may identify the ROI from the first image frame and the ROI from the second image frame. The ROI tracking module 940 may identify a moving distance (e.g., a pixel value) of the ROI between the first image frame and the second image frame. The lens movement amount determining module 960 may determine the movement amount of the lens based on the moving distance of the ROI.

For example, the lens movement amount determining module 960 may determine the movement amount of the lens based on the movement amount of the ROI and the enlargement magnification. When the object detection module 920 identifies the object based on enlarged images, the ROI tracking module 940 may identify a moving distance (e.g., a pixel value) of the ROI based on the enlarged images. In this case, the moving distance of the ROI identified based on the enlarged images may be different from the moving distance of the ROI in non-enlarged images. In order for the lens movement amount to be mapped to the actual movement amount of the ROI, the lens movement amount determining module 960 may determine the movement amount of the lens based on the magnification of the images. For example, the lens movement amount determining module 960 may determine the movement amount of the lens so that the movement amount of the lens is proportional to the movement amount of the ROI, and inversely proportional to the enlargement magnification.

For example, the lens movement amount determining module 960 may determine the movement amount of the lens based on the movement amount of the ROI, the enlargement magnification, and the magnification of the lens. The object detection module 920 may detect the object using the first camera 381, the second camera 382, or the third camera 383. Each of the first camera 381, the second camera 382, and the third camera 383 may have a different optical zoom magnification. Accordingly, the movement amount (displacement amount) of the object in the image may vary depending on the camera used by the object detection module 920. In this case, the lens movement amount determining module 960 may determine the movement amount of the lens by further considering an optical zoom magnification of the camera. For example, a different factor value (e.g., a value set according to the optical zoom magnification of a lens of each camera) may be set for each of the first camera 381, the second camera 382, and the third camera 383. For example, the factor value may be inversely proportional to the optical zoom magnification of the camera. The lens movement amount determining module 960 may determine the movement amount of the lens so that the movement amount of the lens is proportional to a factor value set in the camera used for object detection, proportional to the movement amount of the ROI, and inversely proportional to the enlargement magnification.

For example, the lens movement amount determining module 960 may determine the movement amount of the lens based on a current lens position. When the object detection module 920 detects the object using the second camera 382, a lens to be moved and a lens used to track the object may be the same. Unlike the first camera 381 and the third camera 383 having fixed FOVs, the central axis of the FOV of the second camera 382 may change due to movement of the lens of the second camera 382. Accordingly, the lens movement amount determining module 960 may determine the movement amount of the lens reflected by the lens movement by updating the movement amount of the lens at a short period (e.g., every frame). For example, the movement amount of the lens may include a relative coordinate value (e.g., distance and direction) with respect to the current lens position or an absolute coordinate value set with respect to the lens. In one example, at a first point in time, the lens driving module 970 may perform a first movement determined by the lens movement amount determining module 960. At a second point in time subsequent to the first point in time, the lens movement amount determining module 960 may determine an additional movement amount with the movement of the object. When the first movement is not completed at the second point in time, the lens movement amount determining module 960 may determine the additional movement amount based on the position of the lens at the second point in time. The lens driving module 970 may move the lens based on the additional movement amount at the second point in time. In one example, at the first point in time, the lens driving module 970 may perform the first movement determined by the lens movement amount determining module 960. For example, the lens movement amount determining module 960 may determine the first movement in a movement direction of the object at the first point in time. At the second point in time subsequent to the first point in time, the lens movement amount determining module 960 may determine a second movement for positioning the object at the center of the FOV of the lens. In this case, the first movement may correspond to the movement direction of the object and have an approximate value (e.g., a preset value). After performing the first movement, through the second movement, the lens movement amount determining module 960 may cause the object to be positioned at the center of the FOV of the lens. Determination of the movement amount of the lens in which the movement of the lens is reflected may be described below with reference to FIG. 16.

If the movement amount of the lens is determined, the lens movement amount determining module 960 may transmit the determined movement amount of the lens to the lens driving module. The lens driving module 970 may move the lens of the second camera 382 according to the movement amount of the lens. For example, as described above with reference to FIGS. 7 and 8, the lens driving module 970 may move the lens of the second camera 382 by panning and/or tilting the refractive member 540. In one example, the second camera 382 may include a sensor (e.g., a Hall sensor) that detects the movement of the lens, and may use the sensor to detect the movement of the lens to determine whether the lens is moved according to the amount of movement of the lens.

Figure 10:
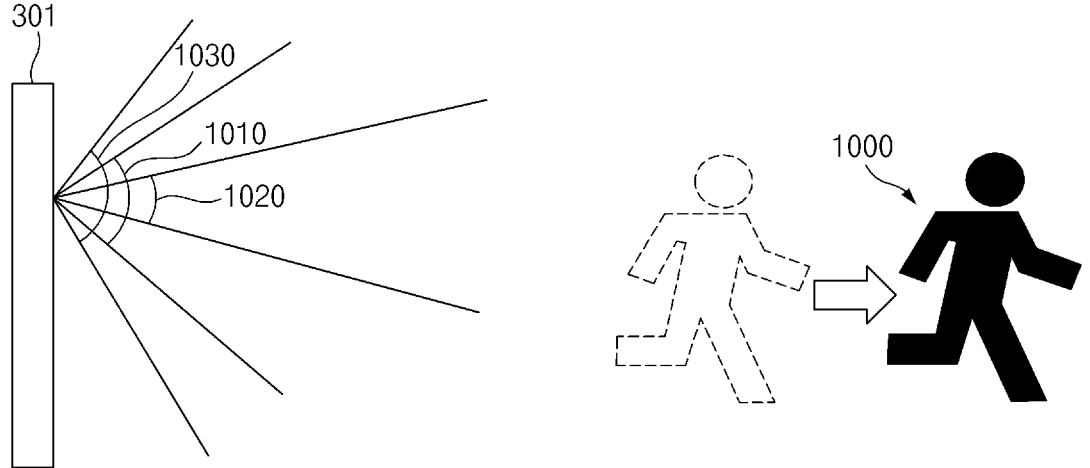
FIG. 10 illustrates a photographing environment of an electronic device according to an embodiment of the disclosure.

FIG. 10 illustrates a photographing environment of an electronic device according to an embodiment of the disclosure.

Referring to FIGS. 3 and 10, the electronic device 301 may photograph an object 1000 using a plurality of cameras. In the example of FIG. 10, the object 1000 is illustrated as a person, but embodiments of the disclosure are not limited thereto. In one example, the object 1000 may include a body part (e.g., a torso, a face, a head, and/or hands), an animal (e.g., a dog and/or a cat), and/or a moving vehicle (e.g., a car, a train, an airplane, and/or a drone).

The first camera 381, the second camera 382, and the third camera 383 may acquire images through one surface of the housing of the electronic device 301. The first camera 381, the second camera 382, and the third camera 393 may acquire images in the same direction (e.g., a rear direction of the electronic device 301).

A first FOV 1010 of the first camera 381 may be wider than a second FOV 1020 of the second camera 382. A third FOV 1030 of the third camera 383 may be wider than the first FOV 1010 of the first camera 381.

In the example of FIG. 10, the user of the electronic device 301 may capture moving images while tracking the object 1000. For example, the user may set the object 1000 to be tracked through a user input. The electronic device 301 may display a preview so that the object 1000 is positioned at a central portion. Even if the user does not move the electronic device 301 with the movement of the object 1000, the electronic device 301 may provide a preview based on object tracking by performing various operations described below. For example, the electronic device 301 may acquire an image using at least one of the first camera 381, the second camera 382, or the third camera 383, and enlarge and/or crop the acquired image, thereby providing, to the user, an image in which the object 1000 is positioned at the central portion. The electronic device 301 may provide the image in which the object 1000 is positioned at the central portion by moving the lens of the second camera 382. The electronic device 301 may perform lens movement of the second camera 382, image enlargement, and/or cropping, thereby providing the image in which the object 1000 is positioned at the central portion. Specific operations of object tracking may be described below with reference to FIGS. 11 to 17.

Simultaneously with providing the preview, the electronic device 301 may store images corresponding to the preview in the memory 330. For example, the electronic device 301 may store images corresponding to the preview as moving images in a specified format. In addition, the electronic device 301 may store images that are not provided as the preview in the memory 330. For example, while displaying a preview of an image acquired using the second camera 382, the electronic device 301 may store images acquired using the first camera 381 and/or the third camera 383 in the memory 330.

Figure 11:
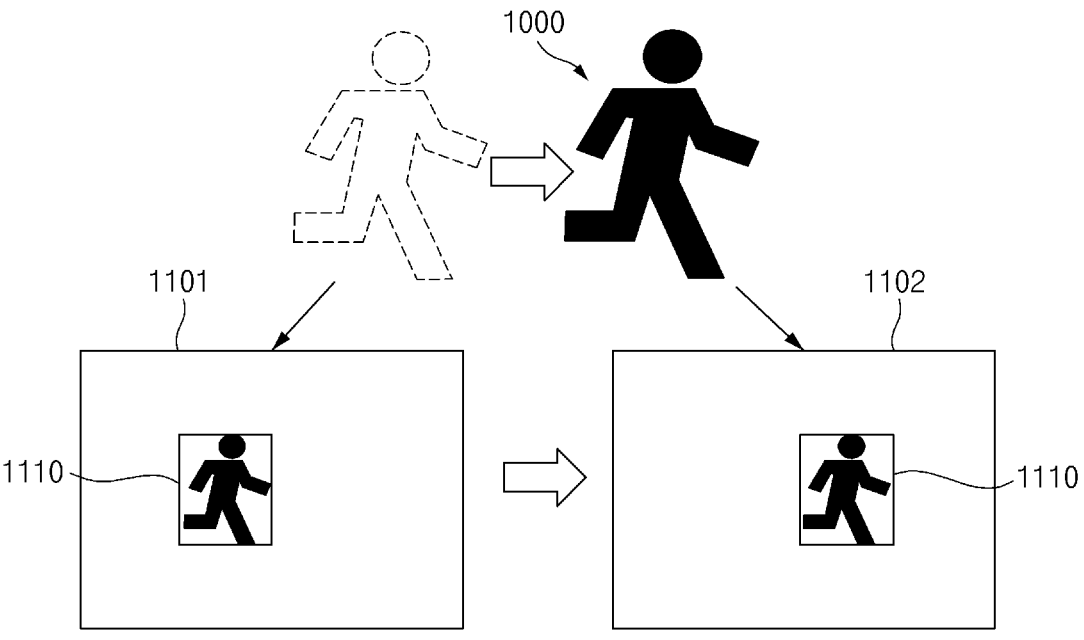
FIG. 11 illustrates object tracking using a first camera according to an embodiment of the disclosure.

FIG. 11 illustrates object tracking using a first camera according to an embodiment of the disclosure.

Referring to FIGS. 3, 10, and 11, according to an embodiment of the disclosure, the electronic device 301 may acquire images using the first camera 381 and identify an object using the acquired images. The electronic device 301 may set an ROI 1110 corresponding to the identified object. Although the ROI 1110 is illustrated as a rectangle in FIG. 11, embodiments of the disclosure are not limited thereto. The electronic device 301 may acquire a first frame 1101 and a second frame 1102 using the first camera 381. The second frame 1102 may be a frame subsequent to the first frame 1101 in a time domain. For example, the first frame 1101 and the second frame 1102 may be consecutive images among a series of images acquired using the first camera 381. For another example, at least one frame may exist between the first frame 1101 and the second frame 1102.

The electronic device 301 may identify a movement of the object 1000 using the first frame 1101 and the second frame 1102. For example, the electronic device 301 may identify the movement of the object 1000 by identifying a position of the ROI 1110 in the first frame 1101 (e.g., the center position of the ROI 1110) and a position of the ROI 1110 in the second frame 1102 and comparing identified positions. For example, the electronic device 301 may identify a distance and direction of the movement of the object 1000. The electronic device 301 may identify the movement between the first frame 1101 and the second frame 1102 based on pixel values.

As will be described below with reference to FIG. 12, the electronic device 301 may control the second camera 382 based on the movement of the identified object 1000.

Figure 12:
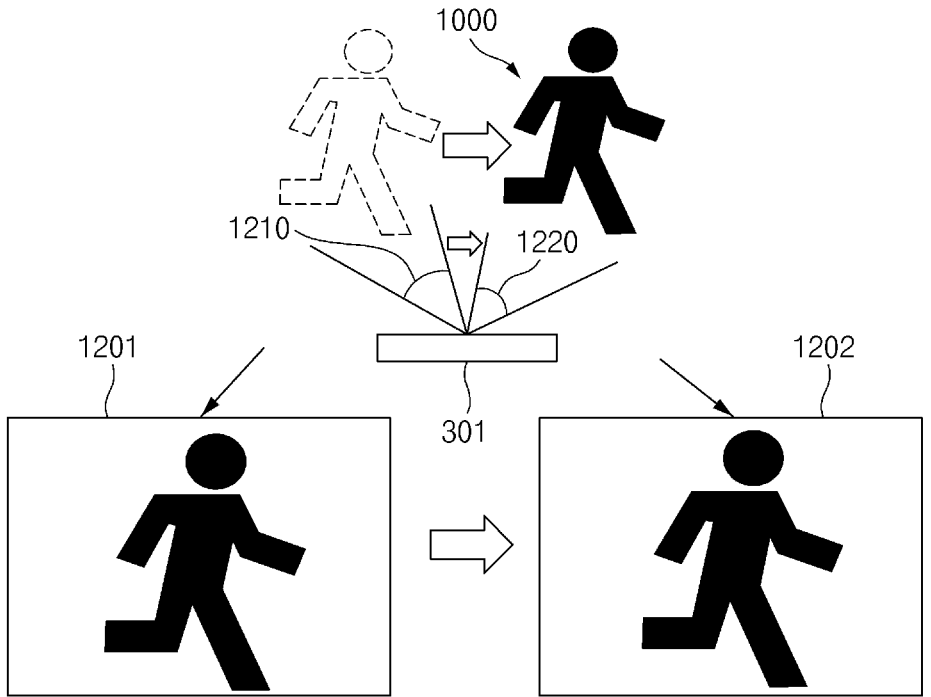
FIG. 12 illustrates a movement of a lens of a second camera according to an embodiment of the disclosure.

FIG. 12 illustrates a movement of a lens of a second camera according to an embodiment of the disclosure.

Referring to FIGS. 3, 10, 11, and 12, according to an embodiment of the disclosure, the electronic device 301 may control the second camera 382 based on the movement of the identified object 1000. For example, the electronic device 301 may identify the movement of the object 1000 from images acquired using the first camera 381 and move the lens of the second camera 382 with the identified movement. In the example of FIG. 12, the FOV (e.g., the second FOV 1020) of the second camera 382 may be changed from a FOV 1210 to a FOV 1220.

The electronic device 301 may display images acquired using the second camera 382 on the display 360. For example, the electronic device 301 may display the first frame 1201 and the second frame 1202 acquired using the second camera 382. The center direction of the FOV of the second camera 382 may be changed with the movement of the lens. Since the lens is moved with the movement of the object 1000, the object 1000 may be positioned at central portions of the first frame 1201 and the second frame 1202.

The electronic device 301 may track the object 1000 having high mobility by tracking the object 1000 using the first camera 381 having a relatively wide FOV (e.g., the first FOV 1010). In addition, since the image is acquired using the second camera 382 having a relatively high magnification, the electronic device 301 may crop the image of the first camera 381 to acquire an image of improved quality compared to the enlarged image.

In the examples of FIGS. 10 and 11, the electronic device 301 has been described as identifying the movement of the object 1000 using the first camera 381 and moving the lens of the second camera 382 based on the identified movement, but embodiments of the disclosure are not limited thereto. For example, the electronic device 301 may identify the movement of the object 1000 using the third camera 383 and move the lens of the second camera 382 based on the identified movement. When the movement amount of the object 1000 is high (e.g., when the movement amount exceeds a threshold value), the electronic device 301 may identify the movement of the object 1000 using the third camera 383. For example, the electronic device 301 may identify the movement of the object 1000 using the second camera 382 and move the lens of the second camera 382 based on the identified movement. When the size of the image corresponding to the object 1000 is small (e.g., when the size is less than a specified value), the electronic device 301 may identify the movement of the object 1000 based on images acquired using the second camera 382.

Figure 13:
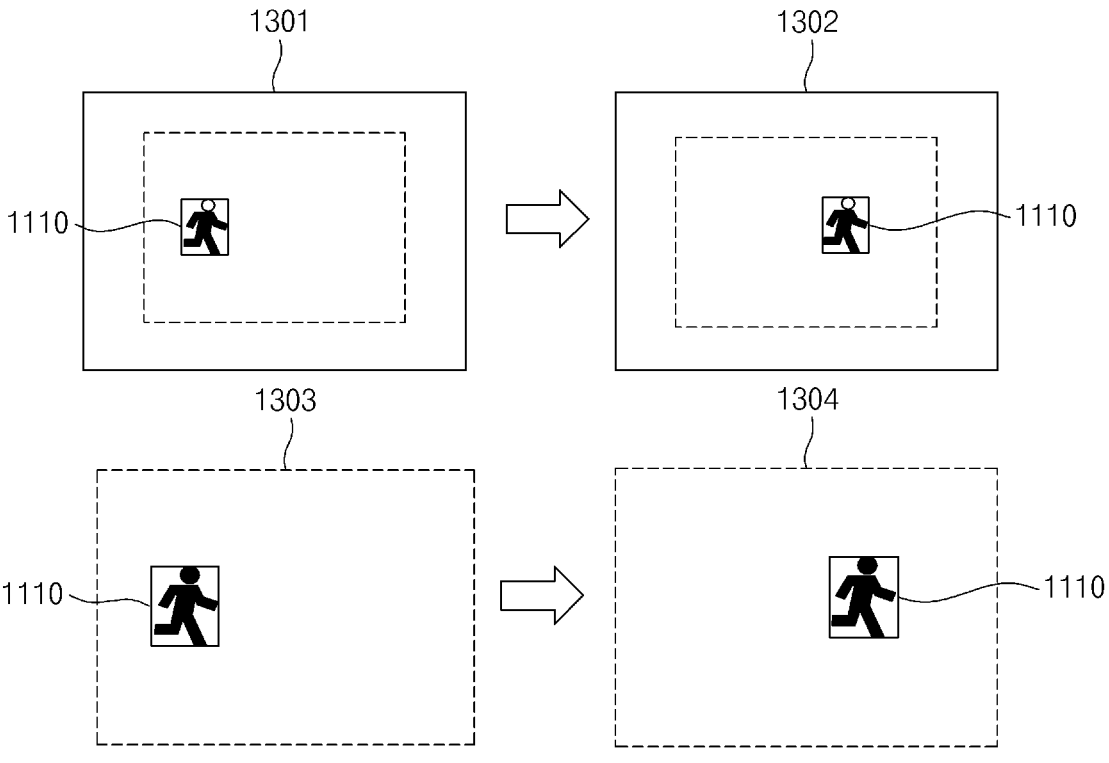
FIG. 13 illustrates object tracking based on an enlarged image according to an embodiment of the disclosure.

FIG. 13 illustrates object tracking based on an enlarged image according to an embodiment of the disclosure.

Referring to FIGS. 3, 10, and 13, according to an embodiment of the disclosure, the electronic device 301 may track the object 1000 based on an enlarged image. For example, when a distance between the object 1000 and the electronic device 301 is long, the size of the object 1000 acquired by the first camera 381 may be small. As the size of the image corresponding to the object 1000 decreases, the electronic device 301 may fail to identify the object 1000 based on the image acquired using the first camera 381. In order to identify the object 1000, the electronic device 301 may track the object 1000 based on the enlarged image. For example, when identification of the object 1000 fails or when the size of the object 1000 is reduced to less than a specified size, the electronic device 301 may identify the object 1000 using the enlarged image.

For example, the electronic device 301 may acquire a first frame 1301 and a second frame 1302 using the first camera 381. In the example of FIG. 13, the size of the ROI 1110 may be smaller than the specified size. The electronic device 301 may not be able to identify the object 1000 from the first frame 1301 and the second frame 1302.

In this case, the electronic device 301 may enlarge a series of images acquired using the first camera 381. For example, the electronic device 301 may generate an enlarged first frame 1303 by enlarging the first frame 1301 and generate an enlarged second frame 1304 by enlarging the second frame 1302. The electronic device 301 may be configured to enlarge specified regions (e.g., a central portions) of the images acquired using the first camera 381. The electronic device 301 may improve image quality while enlarging the image. For example, the electronic device 301 may perform image quality improvement by performing operations, such as upsampling, filtering, and/or interpolation. In one example, the first frame 1301, the second frame 1302, the enlarged first frame 1303, and the enlarged second frame 1304 may include the same number of pixels.

The electronic device 301 may identify the movement of the object 1000 using the enlarged first frame 1303 and the enlarged second frame 1304. For example, the electronic device 301 may identify the movement of the object 1000 by identifying a position of the ROI 1110 in the enlarged first frame 1303 (e.g., the center position of the ROI 1110) and a position of the ROI 1110 in the enlarged second frame 1304 and comparing identified positions. For example, the electronic device 301 may identify a distance and direction of the movement of the object 1000. The electronic device 301 may identify the movement between the enlarged first frame 1303 and the enlarged second frame 1304 based on pixel values.

As described above with reference to FIG. 12, the electronic device 301 may move the lens of the second camera 382 based on the identified movement amount. Unlike the example of FIG. 11, in the example of FIG. 13, since the electronic device 301 identifies the movement amount of the object 1000 using the enlarged images, the movement amount of the lens needs to be corrected. For example, a pixel variation value between frames of the ROI 1110 based on the enlarged first frame 1303 and the enlarged second frame 1304 may not correspond to the actual movement of the object 1000 due to image enlargement. Accordingly, the electronic device 301 may move the lens of the second camera 382 based on the enlargement magnification of the images used for tracking the object 1000. For example, the electronic device 301 may determine the movement amount of the lens of the second camera 382 to be proportional to a pixel variation value of the ROI 1110 and inversely proportional to the enlargement magnification. For example, the electronic device 301 may determine the movement amount of the lens using the lens movement amount determining module 960 of FIG. 9.

In the examples of FIG. 13, the electronic device 301 has been described as identifying the movement of the object 1000 using the first camera 381 and moving the lens of the second camera 382 based on the identified movement, but embodiments of the disclosure are not limited thereto. For example, the electronic device 301 may acquire an image using the third camera 383, enlarge the acquired image, identify the movement of the object 1000 using the enlarged image, and then move the lens of the second camera 382 based on the identified movement. When the movement amount of the object 1000 is high (e.g., when the movement amount exceeds a threshold value), the electronic device 301 may identify the movement of the object 1000 using the third camera 383.

Figure 14:
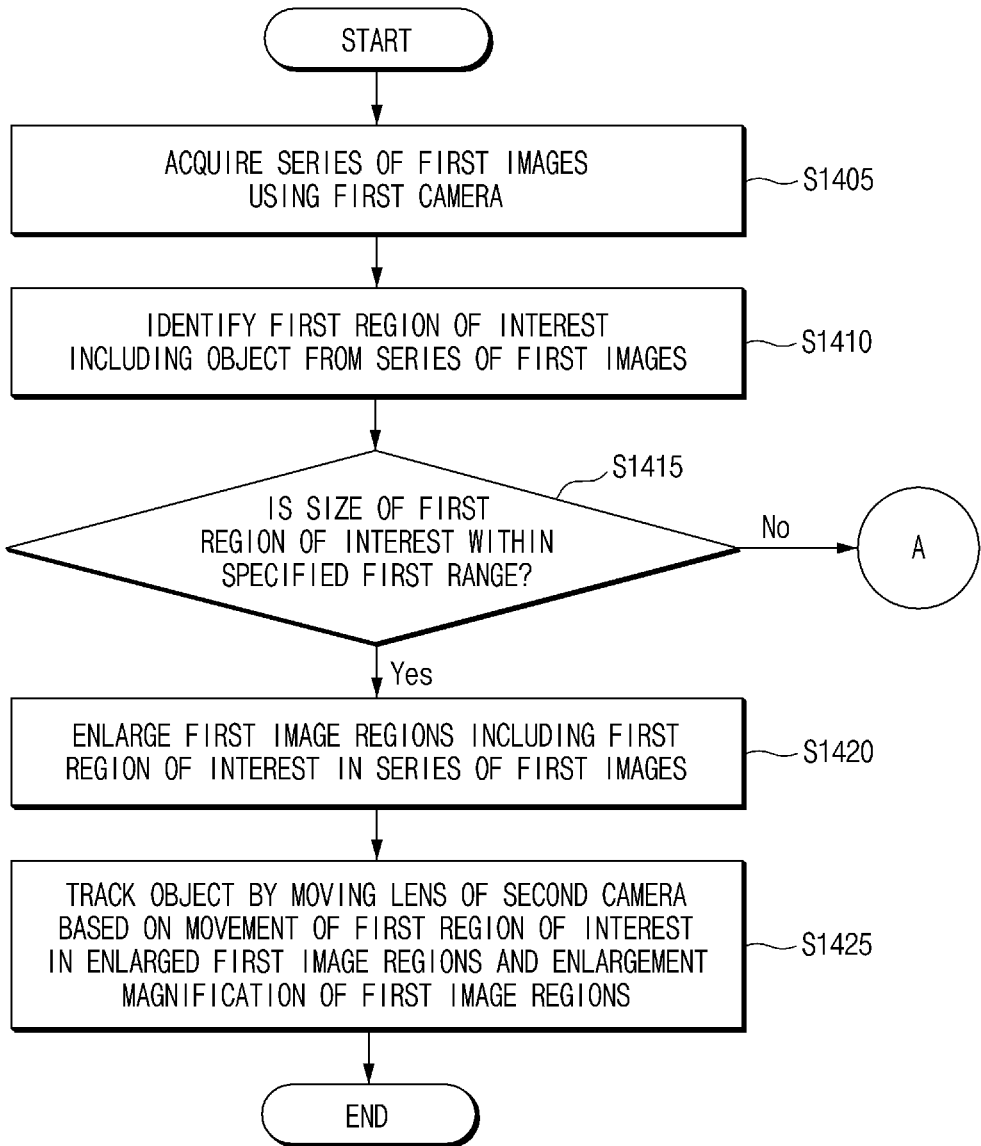
FIG. 14 illustrates a flowchart of an object tracking method according to an embodiment of the disclosure.

FIG. 14 illustrates a flowchart of an object tracking method according to an embodiment of the disclosure.

Referring to FIGS. 3 and 14, in operation 1405, the electronic device 301 may acquire a series of first images using the first camera 381. For example, the series of first images may include an object to be tracked. The series of first images may be images acquired at different times in the time domain, and may be images arranged in time order.

In operation 1410, the electronic device 301 may identify a first region of interest including the object from the series of first images. For example, the electronic device 301 may identify the object specified by the user and identify the first region of interest including the identified object.

In operation 1415, the electronic device 301 may determine whether the size of the first region of interest is within a specified first range. For example, the electronic device 301 may determine whether the size of the first region of interest is within the specified first range based on the number of pixels included in the first region of interest, the length of a diagonal line connecting two vertices of the first region of interest, or a sum of lengths of at least two axes of the first region of interest. The specified first range may correspond to the size of a region of interest in which the object may be identified after enlarging the images using the first camera 381. When the size of the first region of interest does not fall within the specified first range (e.g., NO in operation 1415), the electronic device 301 may proceed to reference A.

In one example, operation 1415 may be replaced with an operation for determining whether the first region of interest has been identified. For example, the electronic device 301 may proceed to reference A when the first region of interest has been identified from the series of first images, and may perform operation 1420 when the first region of interest has not been identified.

When the size of the first region of interest falls within the specified first range (e.g., YES in operation 1415), in operation 1420, the electronic device 301 may enlarge first image regions including the first region of interest in the series of first images. For example, the first image regions may correspond to the central portions in the series of first images. The electronic device 301 may enlarge the first image regions at a specified magnification. While enlarging the first image regions, the electronic device 301 may improve image quality.

In operation 1425, the electronic device 301 may track the object by moving the lens of the second camera 382 based on the movement of the first region of interest in the enlarged first image regions and the enlargement magnification of the first image region. For example, the electronic device 301 may move the central axis of the FOV of the second camera 382 following the object by moving the lens of the second camera 382. In addition, the electronic device 301 may be configured to output images (e.g., a series of second images) acquired using the second camera 382 on the display 360.

Figure 15:
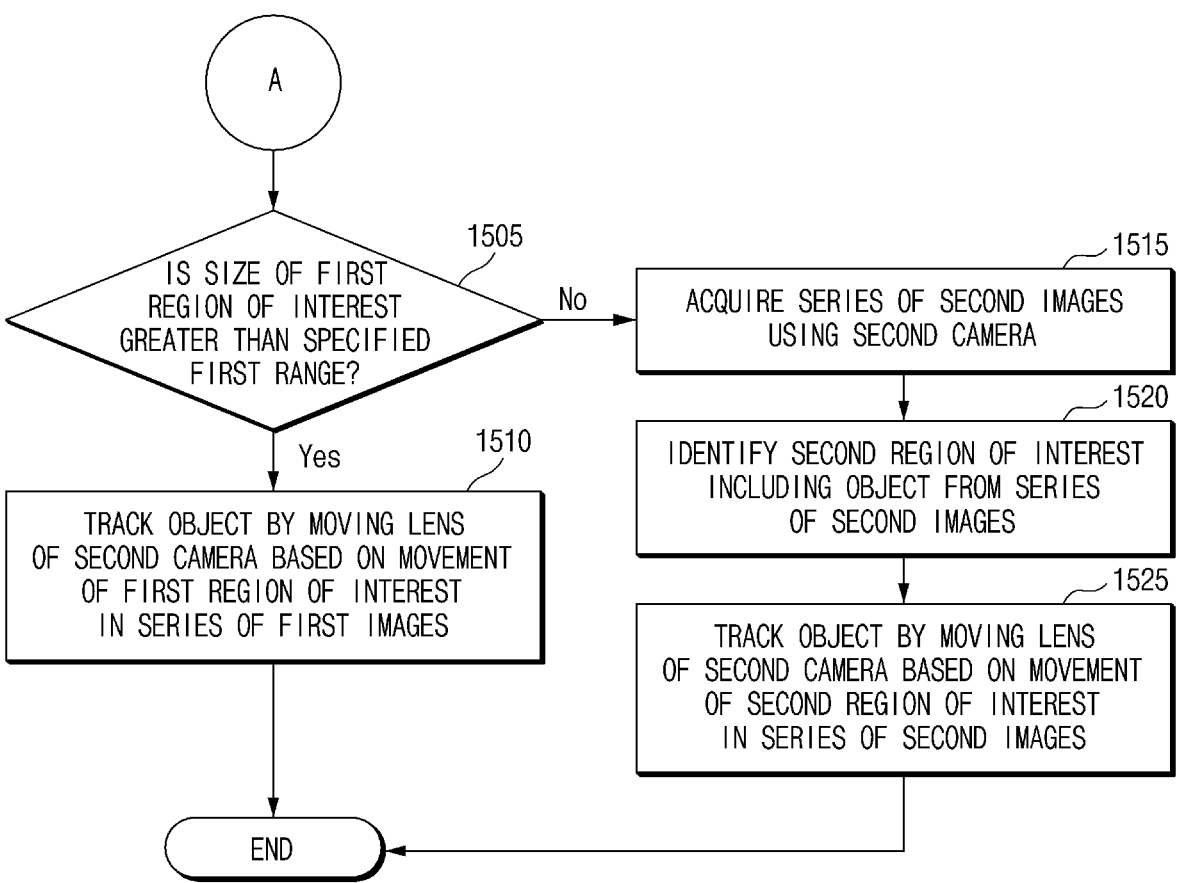
FIG. 15 illustrates a flowchart of an object tracking method according to an embodiment of the disclosure.

FIG. 15 illustrates a flowchart of an object tracking method according to an embodiment of the disclosure.

Referring to FIG. 15, when the size of the first region of interest does not fall within the specified first range (e.g., NO in operation 1415 of FIG. 14), in operation 1505, the electronic device 301 may determine whether the size of the first region of interest is greater than the specified first range. When the size of the first region of interest is greater than the specified first range (e.g., YES in operation 1505), in operation 1510, the electronic device 301 may track the object by moving the lens of the second camera based on the movement of the first region of interest in the series of first images. Since the size of the image corresponding to the object is sufficient, the electronic device 301 may perform object tracking without enlarging the image.

When the size of the first region of interest is smaller than the specified first range (e.g., NO in operation 1505), in operation 1515, the electronic device 301 may acquire a series of second images using the second camera 382. In operation 1520, the electronic device 301 may identify a second region of interest including the object from the series of second images. In operation 1525, the electronic device 301 may track the object by moving the lens of the second camera 382 based on the movement of the second region of interest in the series of second images.

In the examples of FIGS. 14 and 15, the electronic device 301 has been described as acquiring images for object tracking using the first camera 381 or the second camera 382, but embodiments of the disclosure is not limited thereto. For example, the electronic device 301 may acquire images for object tracking using the third camera 383 instead of the first camera 381. For example, when the mobility of the object is high, the electronic device 301 may acquire images for object tracking using the third camera 383 having a wider FOV.

Figure 16:
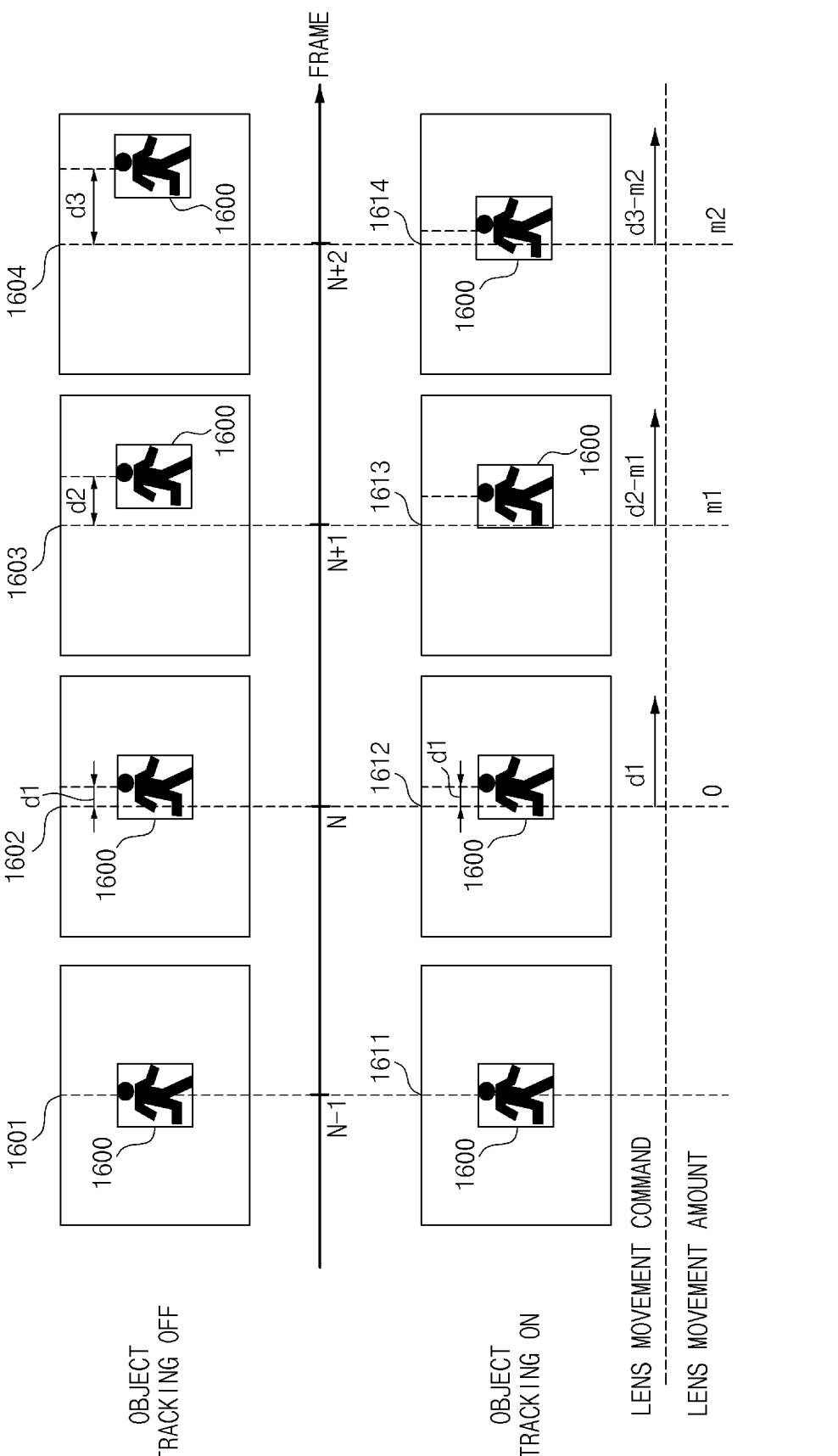
FIG. 16 illustrates a movement of a lens of a second camera according to an embodiment of the disclosure.

FIG. 16 illustrates a movement of a lens of a second camera according to an embodiment of the disclosure.

Referring to FIG. 16, in operation 1525 of FIG. 15, object tracking using the second camera 382 may be performed simultaneously with the movement of the lens. In this case, the electronic device 301 may move the lens of the second camera 382 based on the change of the FOV with the movement of the lens.

Referring to FIGS. 3 and 16, upper images 1601, 1602, 1603, and 1604 represent images acquired by the second camera 382 when object tracking is deactivated. It can be assumed that, on an image 1602 of an Nth frame, an ROI 1600 is moved by d1 compared to an image 1601 of an N−1th frame. It can be assumed that, on an image 1603 of an N+1th frame, the ROI 1600 is moved by d2 compared to the image 1601 of the N−1th frame. It can be assumed that, on an image 1604 of an N+2th frame, the ROI 1600 is moved by d3 compared to the image 1601 of the N−1th frame.

Lower images 1611, 1612, 1613, and 1614 of FIG. 16 represent images acquired by the second camera 382 when object tracking is activated. In the example of FIG. 16, it may be assumed that the electronic device 301 tracks an object using images acquired by the second camera 382.

In the Nth frame, the electronic device 301 may identify the movement of the ROI 1600. For example, the electronic device 301 may identify the movement of the ROI 1600 by comparing an image 1611 of the N−1th frame and an image 1612 of the Nth frame. According to an embodiment of the disclosure, the electronic device 301 may determine a movement of the lens when the movement of the ROI 1600 is equal to or greater than a specified amount or when the ROI 1600 is out of a specified region (e.g., the central region of an image). The electronic device 301 may prevent deterioration of image quality due to the movement of the lens by reducing the number of movements of the lens.

In the Nth frame, the electronic device 301 may generate a lens movement command with the movement of the ROI 1600. For example, the electronic device 301 may generate a lens movement command for moving the lens of the second camera 382 to a position (e.g., coordinates) corresponding to d1.

In the N+1 th frame, the electronic device 301 may generate a new lens movement command. In the N+1th frame, the movement amount of the lens may be assumed to be m1. The electronic device 301 may generate a new lens movement command based on the movement amount of the lens. For example, the electronic device 301 may generate a lens movement command having a movement amount corresponding to d2−m1.

In the N+2th frame, the electronic device 301 may generate a new lens movement command. In the N+2th frame, the movement amount of the lens may be assumed to be m2. The electronic device 301 may generate a new lens movement command based on the movement amount of the lens. For example, the electronic device 301 may generate a lens movement command having a movement amount corresponding to d3−m2.

As described above with reference to FIG. 16, the electronic device 301 may perform object tracking based on the movement amount of the lens by updating the movement amount of the lens for each frame.

Figure 17:
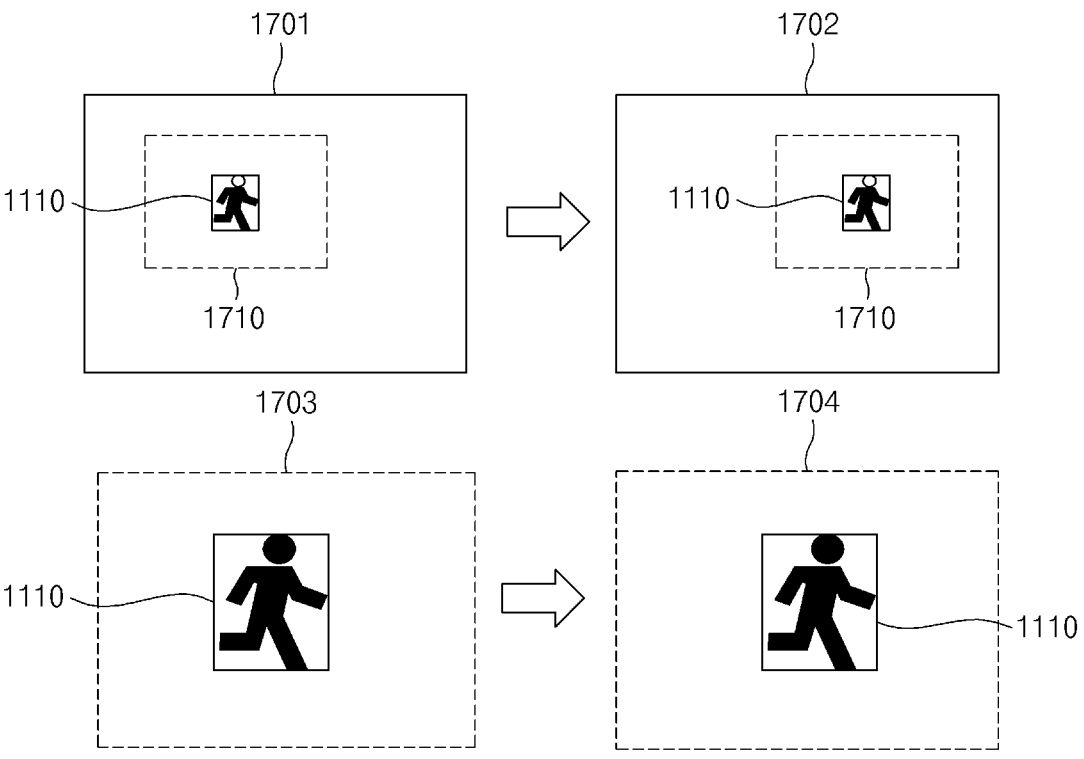
FIG. 17 illustrates a movement of an enlarged region according to an embodiment of the disclosure.

FIG. 17 illustrates a movement of an enlarged region according to an embodiment of the disclosure.

In the example of FIG. 13, an example in which an enlarged region is fixed has been described, but embodiments of the disclosure are not limited thereto. For example, the electronic device 301 may move an image region to be enlarged so that the ROI is positioned at the central portion of an enlarged image.

Referring to FIGS. 3 and 17, a first image 1701 and a second image 1702 represent images used for object tracking. For example, the first image 1701 and the second image 1702 may be acquired using the first camera 381 or the third camera 383.

According to an embodiment of the disclosure, the electronic device 301 may move an image region 1710 to be enlarged in the image. For example, when the movement amount of an object is large or when the size of the ROI 1710 is small and magnification is required to be higher, the electronic device 301 may enlarge the image while moving the image region 1710. The electronic device 301 may identify the movement of the region of interest 1110 using an enlarged first image 1703 and an enlarged second image 1704.

When the image region 1710 is moved, the electronic device 301 may move the lens of the second camera 382 based on the movement of the image region 1710. For example, the electronic device 301 may move the lens based on a value obtained by adding the movement amount of the image region 1710 in the first image 1701 and the second image 1702 to a value obtained by dividing the movement amount of the ROI 1110 based on the enlarged first image 1703 and the enlarged second image 1704 by an enlargement magnification. The enlargement magnification may be considered for the enlarged first image 1703 and the enlarged second image 1704, but may not be considered for the movement amount of the image region 1710. Further, as described above, a factor set for a camera used for image acquisition (e.g., a value inversely proportional to an optical zoom magnification) may be multiplied.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a first camera having a first field of view (FOV);
a second camera having a second FOV narrower than the first FOV;
memory, comprising one or more storage media, storing instructions; and
one or more processors communicatively coupled to the display, the first camera, the second camera, and the memory,
wherein the instructions, when executed by the one or more processors individually or collectively, cause the electronic device to:
acquire a series of first images using the first camera,
identify a first region of interest including an object from the series of first images,
enlarge a first image region including the first region of interest if a size of the first region of interest is within a specified first range,
acquire a series of second images using the second camera while tracking the object, the series of second images being acquired by moving a lens of the second camera according to a movement amount of the lens of the second camera, and
display the series of second images on the display,
wherein the movement amount of the lens of the second camera is in inverse proportion to an enlargement magnification of the first image region and in proportion to a movement of the first region of interest within the enlarged first image region, and wherein the enlargement magnification of the first image region corresponds to an amount of magnification of the enlarging of the first image region.

2. The electronic device of claim 1, wherein the instructions, when executed by the one or more processors individually or collectively, further cause the electronic device to:
determine the movement amount of the lens further based on a value set based on the enlargement magnification, the movement of the first region of interest, and an optical magnification of the first camera.

3. The electronic device of claim 1, wherein the instructions, when executed by the one or more processors individually or collectively, further cause the electronic device to:
determine the movement amount of the lens further based on the enlargement magnification, the movement of the first region of interest, and a movement of the first image region in the series of first images.

4. The electronic device of claim 1, wherein the instructions, when executed by the one or more processors individually or collectively, further cause the electronic device to:
change a direction in which the second FOV faces by moving the lens.

5. The electronic device of claim 1, wherein the instructions, when executed by the one or more processors individually or collectively, further cause the electronic device to:
identify a second region of interest corresponding to the object from the series of second images if the size of the first region of interest is smaller than the specified first range;
identify movement of the second region of interest from the series of second images; and
move the lens of the second camera based on the identified movement of the second region of interest.

6. The electronic device of claim 5, wherein the instructions, when executed by the one or more processors individually or collectively, further cause the electronic device to:
identify a first movement of the second region of interest from a first frame and a second frame subsequent to the first frame among the series of second images;
move the lens of the second camera to a specified value based on the identified first movement;
identify a second movement of the second region of interest from the second frame and a third frame subsequent to the second frame among the series of second images; and
track the object based on the movement of the lens of the second camera and a movement of the object by updating the specified value based on the identified second movement.

7. The electronic device of claim 1, wherein the instructions, when executed by the one or more processors individually or collectively, further cause the electronic device to:
identify the first region of interest from the series of first images if the size of the first region of interest is larger than the specified first range; and
track the object by moving the lens of the second camera based on the movement of the first region of interest in the series of first images.

8. The electronic device of claim 1, wherein the second camera includes an image sensor, a lens assembly, and a refractive member that refracts incident light to the image sensor through the lens assembly, and wherein the instructions, when executed by the one or more processors individually or collectively, further cause the electronic device to:

move the lens by rotating the refractive member.

9. The electronic device of claim 1, wherein the first camera includes a wide-angle camera and the second camera includes a telephoto camera.

10. A method performed by an electronic device for object tracking, the method comprising:

acquiring a series of first images using a first camera having a first field of view (FOV);

identifying a first region of interest including an object from the series of first images;

enlarging a first image region including the first region of interest based on a size of the first region of interest being within a specified first range; and acquiring a series of second images using a second camera having a second FOV narrower than the first FOV while tracking the object, the series of second images being acquired by moving a lens of the second camera according to a movement amount of the lens of the second camera, wherein the movement amount of the lens of the second camera is in inverse proportion to an enlargement magnification of the first image region and in proportion to a movement of the first region of interest within the enlarged first image region, and wherein the enlargement magnification of the first image region corresponds to an amount of magnification of the enlarging of the first image region.

11. The method of claim 10, wherein the determining of the movement amount of the lens includes determining the movement amount of the lens further based on a value set based on the enlargement magnification, the movement of the first region of interest, and an optical magnification of the first camera.

12. The method of claim 10, wherein the determining of the movement amount of the lens includes determining the movement amount of the lens further based on the enlargement magnification, the movement of the first region of interest, and a movement of the first image region in the series of first images.

13. The method of claim 10, wherein the tracking of the object includes changing a direction in which the second FOV faces by moving the lens.

14. The method of claim 10, further comprising:

identifying a second region of interest corresponding to the object from the series of second images based on the size of the second region of interest being smaller than the specified first range;

identifying movement of the second region of interest from the series of second images; and moving the lens of the second camera based on the movement of the second region of interest.

15. The method of claim 14, further comprising:

identifying a first movement of the second region of interest from a first frame and a second frame subsequent to the first frame among the series of second images;

moving the lens of the second camera to a specified value based on the first movement;

identifying a second movement of the second region of interest from the second frame and a third frame subsequent to the second frame among the series of second images; and tracking the object based on movement of the lens of the second camera and a movement of the object by updating the specified value based on the second movement.

16. The method of claim 10, further comprising:

identifying the first region of interest from the series of first images based on the size of the first region of interest being larger than the specified first range; and tracking the object by moving the lens of the second camera based on the movement of the first region of interest in the series of first images.

17. The method of claim 10, wherein the second camera includes an image sensor, a lens assembly, and a refractive member that refracts incident light to the image sensor through the lens assembly, and wherein the electronic device moves the lens by rotating the refractive member.

18. The method of claim 10, wherein the first camera includes a wide-angle camera and the second camera includes a telephoto camera.

* * * * *